United States Patent
Brisebois et al.

(10) Patent No.: US 11,644,628 B1
(45) Date of Patent: May 9, 2023

(54) MICRO-OPTICAL CONNECTOR HOLDER WITH INTEGRATED MATING SYSTEM

(71) Applicant: Ciena Corporation, Hanover, MD (US)

(72) Inventors: Yannick Brisebois, Ottawa (CA); Victor Aldea, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/587,606

(22) Filed: Jan. 28, 2022

(51) Int. Cl.
*H04B 10/00* (2013.01)
*G02B 6/42* (2006.01)

(52) U.S. Cl.
CPC .......... *G02B 6/4231* (2013.01); *G02B 6/428* (2013.01); *G02B 6/4242* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,737,004 A * | 4/1988 | Amitay | ............... | G02B 6/389 385/47 |
| 4,767,168 A * | 8/1988 | Grandy | ............... | G02B 6/4274 385/94 |
| 4,796,968 A * | 1/1989 | Coccoli | ............... | G02B 6/245 216/33 |
| 4,877,300 A * | 10/1989 | Newhouse | ............... | G02B 6/262 385/43 |
| 5,317,663 A * | 5/1994 | Beard | ............... | G02B 6/3825 385/70 |
| 5,394,503 A * | 2/1995 | Dietz, Jr. | ............... | G02B 6/3895 385/139 |
| 5,413,494 A * | 5/1995 | Dewey | ............... | H04Q 1/142 439/669 |
| 5,494,461 A * | 2/1996 | Bippus | ............... | H01R 4/2429 439/922 |
| 5,579,425 A * | 11/1996 | Lampert | ............... | G02B 6/3869 385/59 |
| 5,708,745 A * | 1/1998 | Yamaji | ............... | G02B 6/3849 385/139 |
| 5,875,047 A * | 2/1999 | Abe | ............... | H04B 10/60 398/135 |
| 6,442,306 B1 * | 8/2002 | Dautartas | ............... | G02B 6/3834 385/16 |
| 6,511,231 B2 * | 1/2003 | Lampert | ............... | G02B 6/3825 439/489 |
| 6,832,858 B2 * | 12/2004 | Roth | ............... | G02B 6/3849 385/71 |
| 7,013,088 B1 * | 3/2006 | Jiang | ............... | G02B 6/4214 398/139 |

(Continued)

*Primary Examiner* — Agustin Bello
(74) *Attorney, Agent, or Firm* — Clements Bernard Walker; Christopher L. Bernard (57) ABSTRACT

A micro-optical connector holder with an integrated mating system for an optical assembly, typically on a modem PCBA. The integrated mating system is used to hold the micro-optical connectors together during assembly and to apply constant pressure keeping the connectors fully mated. The invention also uses a spring-pin mechanism to keep the holder lid and connectors in place without the use of screws or glue to make assembly easier. The integrated mating system allows the micro-optical connectors to be easily installed and uninstalled for manufacturing and testing purposes. The connector plugs and connector receptacles are aligned and secured by the integrated connector holder.

19 Claims, 10 Drawing Sheets

(56) References Cited

U.S. PATENT DOCUMENTS

| | | | | |
|---|---|---|---|---|
| 7,226,217 B1* | 6/2007 | Benton | G02B 6/3825 | 385/88 |
| 7,239,699 B2* | 7/2007 | Dunne | H04L 49/40 | 379/413.04 |
| 7,869,426 B2* | 1/2011 | Hough | H04L 12/66 | 340/687 |
| 8,186,890 B2* | 5/2012 | Lu | G02B 6/3879 | 385/139 |
| 8,213,760 B2* | 7/2012 | Rudenick | G02B 6/4455 | 385/134 |
| 8,442,375 B2* | 5/2013 | Bylander | G02B 6/3833 | 385/137 |
| 8,690,593 B2* | 4/2014 | Anderson | G02B 6/3807 | 439/660 |
| 9,004,779 B2* | 4/2015 | Horibe | G02B 6/3898 | 385/78 |
| 9,063,298 B2* | 6/2015 | Coffey | G02B 6/3895 | |
| 9,360,643 B2* | 6/2016 | Rinzler | G02B 6/262 | |
| 9,423,586 B2* | 8/2016 | Sun | G02B 6/46 | |
| 9,453,971 B2* | 9/2016 | Anderson | G02B 6/3825 | |
| 9,500,814 B2* | 11/2016 | Pepe | H01R 12/7076 | |
| 9,632,255 B2* | 4/2017 | Anderson | G02B 6/3807 | |
| 9,810,859 B2* | 11/2017 | Scherer | G02B 6/36 | |
| 9,910,235 B2* | 3/2018 | Larson | G02B 6/4452 | |
| 10,062,993 B1* | 8/2018 | Lutkiewicz | H01R 12/62 | |
| 10,101,542 B2* | 10/2018 | Kostecka | G02B 6/4441 | |
| 10,185,094 B2* | 1/2019 | Isenhour | G02B 6/3817 | |
| 10,209,459 B2* | 2/2019 | Wang | G02B 6/3855 | |
| 10,509,180 B2 | 12/2019 | Meunier et al. | | |
| 10,545,305 B2* | 1/2020 | Leeman | G02B 6/4454 | |
| 10,638,631 B2 | 4/2020 | O'Leary et al. | | |
| 10,663,679 B2* | 5/2020 | Sawicki | G02B 6/3898 | |
| 10,684,424 B1* | 6/2020 | Farnan | G02B 6/32 | |
| 10,845,548 B2* | 11/2020 | Takeuchi | G02B 6/385 | |
| 10,852,497 B2* | 12/2020 | Maniloff | G02B 6/4296 | |
| 11,109,515 B1* | 8/2021 | Nagarajan | G02B 6/428 | |
| 11,178,473 B1* | 11/2021 | Nagarajan | H04B 10/40 | |
| 11,226,453 B2* | 1/2022 | Coffey | G02B 6/3825 | |
| 11,378,757 B1* | 7/2022 | O'Leary | G02B 6/3897 | |
| 2002/0003931 A1* | 1/2002 | Cairns | G02B 6/3816 | 385/56 |
| 2002/0081076 A1* | 6/2002 | Lampert | G02B 6/3895 | 385/72 |
| 2003/0002808 A1* | 1/2003 | Lampert | G02B 6/3895 | 385/70 |
| 2006/0153515 A1* | 7/2006 | Honma | G02B 6/3806 | 385/134 |
| 2011/0116748 A1* | 5/2011 | Smrha | G02B 6/3825 | 385/76 |
| 2011/0222819 A1* | 9/2011 | Anderson | G02B 6/3879 | 385/78 |
| 2011/0255837 A1* | 10/2011 | Solheid | G02B 6/4447 | 385/136 |
| 2011/0293223 A1* | 12/2011 | Shimazu | G02B 6/3869 | 385/81 |
| 2013/0011102 A1* | 1/2013 | Rinzler | G02B 6/262 | 385/94 |
| 2014/0286610 A1* | 9/2014 | Anderson | G02B 6/3893 | 385/76 |
| 2015/0117822 A1* | 4/2015 | Hu | G02B 6/3858 | 385/86 |
| 2016/0066466 A1 | 3/2016 | Aldea et al. | | |
| 2016/0070071 A1* | 3/2016 | Martelius | G02B 6/3656 | 385/25 |
| 2016/0077287 A1* | 3/2016 | Isenhour | G02B 6/4293 | 385/76 |
| 2016/0370547 A1* | 12/2016 | Logan, Jr. | G02B 6/4246 | |
| 2017/0003459 A1* | 1/2017 | Takeuchi | G02B 6/3821 | |
| 2017/0293100 A1* | 10/2017 | Solheid | G02B 6/4457 | |
| 2018/0136410 A1* | 5/2018 | Takeuchi | G02B 6/3895 | |
| 2019/0072728 A1* | 3/2019 | Rolfe | G02B 6/3893 | |
| 2020/0192043 A1* | 6/2020 | Geens | H02G 15/013 | |
| 2020/0257067 A1 | 8/2020 | Meunier et al. | | |
| 2020/0271877 A1 | 8/2020 | Maniloff et al. | | |
| 2021/0011239 A1* | 1/2021 | Geens | G02B 6/3897 | |
| 2021/0084746 A1 | 3/2021 | O'Leary et al. | | |
| 2021/0385000 A1* | 12/2021 | Nagarajan | H04J 14/02 | |
| 2022/0120989 A1* | 4/2022 | Takeuchi | G02B 6/4471 | |
| 2022/0260791 A1* | 8/2022 | Ninomiya | G02B 6/4261 | |

\* cited by examiner

MICRO-OPTICAL CONNECTOR HOLDER WITH INTEGRATED MATING SYSTEM

FIELD OF THE DISCLOSURE

The present disclosure generally relates to optical networking devices. More particularly, the present disclosure relates to systems and methods for a micro-optical connector holder with integrated mating system.

BACKGROUND OF THE DISCLOSURE

Typical optical assemblies such as modems and the like include a plurality of micro-optical connectors to transmit and receive data. These micro-optical connectors are small and can prove to be challenging to install and uninstall when manufacturing and testing activities require to do so. Current methods rely on mechanisms which are difficult to mate and unmated. These mating mechanisms are very small, fragile, and difficult to assemble, causing some optical fibers to break or unlatch and requiring the optical assembly to be fixed or replaced, thus adding cost and time. A typical optical assembly using micro-optical connectors includes a holder held in place by a fiber tray mounted to a board or PCB, and two sets of pigtail connectors for incoming and outgoing traffic (Tx and Rx). Each pigtail connector includes one plug and one receptacle. The locking mechanism on typical micro-optical connectors is difficult to be serviced, this can cause problems when optical assemblies are tested.

BRIEF SUMMARY OF THE DISCLOSURE

In various embodiments, the present disclosure includes a micro-optical connector holder with an integrated mating system for an optical assembly, typically on a modem PCBA. The integrated mating system is used to hold the micro-optical connectors together during assembly and to apply constant pressure keeping the connectors fully mated. The invention also uses a spring-pin mechanism to keep the holder lid and connectors in place without the use of screws or glue to make assembly easier. The integrated mating system allows the micro-optical connectors to be easily installed and uninstalled for manufacturing and testing purposes. The connector plugs and connector receptacles are aligned and secured by the integrated connector holder.

In an embodiment, the present disclosure provides an integrated connector holder, includes: a holder lid; a holder base; and a plurality of connectors adapted to be positioned and secured by the holder lid and holder base. The connectors are adapted to couple fiber optic cables. The integrated connector holder is adapted to be used in an optical assembly. The integrated connector holder further includes a spring-pin mechanism to secure the holder lid onto the holder base, wherein the holder lid is removable from the holder base. The holder lid includes a hole to accept a pin of the spring-pin mechanism to secure the holder lid. The holder lid includes a plurality of tabs and the holder base includes a plurality of grooves, wherein the tabs are adapted to be inserted into the grooves to secure and retain the holder lid onto the holder base. The plurality of connectors includes a connector plug and a connector receptacle adapted to be disposed and secured within the holder lid and the holder base. The holder lid includes bearing surfaces to compress a flange of the connector plugs to secure the connector plugs in the integrated connector holder. The holder base includes bearing surfaces to compress a plurality of connector springs onto a flange of the plurality of connector receptacles to facilitate a secure connection of the connector plugs and connector receptacles. The connector plugs are those of male connectors and the connector receptacles are those of female connectors, and wherein the connector plugs are adapted to be inserted into the connector receptacles.

In another embodiment, the present disclosure provides A module for use in a hardware platform for networking, computing, and/or storage, the module includes: a Printed Circuit Board (PCB); a plurality of components electrically mounted to the PCB; an integrated connector holder including; a holder lid; a holder base; and a plurality of connectors adapted to be positioned and secured by the holder lid and holder base. The connectors are adapted to couple fiber optic cables. The module is an optical assembly. The module further includes a spring-pin mechanism to secure the holder lid onto the holder base, wherein the holder lid is removable from the holder base. The holder lid includes a hole to accept a pin of the spring-pin mechanism to secure the holder lid. The holder lid includes a plurality of tabs and the holder base includes a plurality of grooves, wherein the tabs are adapted to be inserted into the grooves to secure and retain the holder lid onto the holder base. The plurality of connectors includes a connector plug and a connector receptacle adapted to be disposed and secured within the holder lid and the holder base. The holder lid includes bearing surfaces to compress a flange of the connector plugs to secure the connector plugs in the integrated connector holder. The holder base includes bearing surfaces to compress a plurality of connector springs onto a flange of the plurality of connector receptacles to facilitate a secure connection of the connector plugs and connector receptacles. The connector plugs are those of male connectors and the connector receptacles are those of female connectors, and wherein the connector plugs are adapted to be inserted into the connector receptacles.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for securing a plurality of micro-optical connectors via a micro-optical connector holder with an integrated mating system for an optical assembly, typically on a modem PCBA. The integrated mating system is used to hold the micro-optical connectors together during assembly and to apply constant pressure keeping the connectors fully mated. The invention also uses a spring-pin mechanism to keep the holder lid and connectors in place without the use of screws or glue to make assembly easier. The integrated mating system allows the micro-optical connectors to be easily installed and uninstalled for manufacturing and testing purposes. The connector plugs and connector receptacles are aligned and secured by the integrated connector holder.

A typical optical assembly using micro-optical connectors includes a holder held in place by a fiber tray mounted to a board or Printed Circuit Board (PCB), and two sets of pigtail connectors for incoming and outgoing traffic (Tx and Rx). Each pigtail connector includes one plug and one receptacle. The current method used relies on the mating mechanisms provided by the pigtails themselves, in one case, the connectors themselves include locking mechanisms to secure the connectors. These mating mechanisms are very small, fragile, and difficult to assemble, causing some fibers to break or unlatch and requiring the optical assembly to be fixed or replaced. This is due to the connectors not being adapted to be removed once installed.

Current connectors being used on optical assemblies use a mating plug and a receptacle design. The plug has two sheet metal arm clips with a spring, while the receptacle has mating grooves. To assemble the connector, the plug needs to be lined up and oriented with the receptacle, and then pushed together so the sheet metal arm clips latch onto the receptacle mating grooves. Some manufacturers recommend using their custom tool to mate the connectors together, however the tool does not work for most optical assemblies, since often one pigtail connector end needs to be secured in place first.

The current design has many issues including the geometry of the connectors makes it difficult for either pigtail connector end to be held securely. If the securing clips are bent or only one clip arm latches, the connectors will separate, requiring the optical assembly to be reworked. The plug mating design has many small fragile parts including the clip arms which are easy to bend out of shape and the spring can come loose and fall off. Assembling the connectors requires precise alignment and orientation for a proper connection.

To separate the connectors, a reverse-action tweezer tool is required to gently open the arm-clips, while a second set of tweezers needs to pull the plug from the receptacle. Separating the connector can cause one of the pigtail connector ends to fall apart or break, or the ceramic ferrule will fall out, often requiring the complete replacement of the pigtail connectors. The present invention has multiple features to reduce the problems related to the connectors in current use.

The present invention works to simplify the installation and assembly of the micro-optical connector by using a micro-optical pigtail connector design and the integrated connector mating system on the holder of the present disclosure. Instead of relying on the complex design of the mating mechanism on the existing connector, the micro-optical connector is a simple blind mate that can be used in any orientation, relying on the connector holder base and the connector spring to provide the mating force.

The integrated connector mating system works by adding a connector spring just large enough to fit around the connector receptacle body prior to splicing. The receptacle and connector spring are then inserted into the holder base by compressing the spring and pressing down. The pressure of the connector spring will hold the receptacle in place temporally once inserted into place, allowing a second receptacle to be installed. Next, the corresponding Tx and Rx plugs are gently inserted into the respective receptacles. The holder lid is then installed using a downwards motion, cradling the plugs, and sliding into place pushing the plugs and receptacles together. The invention uses a spring-pin mechanism including a locking pin, locking spring, and locking insert with locking tabs to secure the holder lid in place when fully mated instead of screws or glue to facilitate the assembly.

To remove the connectors for service or testing, the spring-pin mechanism is pushed down, and the holder lid is slid off the assembly. The plugs can then be disconnected from the receptacles. To remove the receptacles from the holder base, the connector receptacle can be lifted up, compressing the spring gently until the connector is free. This process only requires a common tweezer-like tool to push down the spring-pin mechanism.

Using the integrated spring mating system of the present disclosure means the fragile mating system from the pigtail connector themselves can be removed, eliminating multiple points of failure. The connectors are instead held mated together by the geometry of the holder and a single compression spring, which are much stronger parts and will not break, reducing risk and repair. The connector geometry offers a much easier method of holding and securing them in place, offering a more secure connection. The assembly process of the connector of the present disclosure is simple and reliable, reducing time by the mating geometry of the holder lid locking tabs and the spring-pin locking mechanism. If the connectors need to be separated for service or testing, the present invention can be taken apart using a pin to push down on the spring-pin locking mechanism to remove the holder lid, thus allowing the connectors to be removed safely without damaging the fiber. It will be appreciated that the optical assembly of the present disclosure may be any module, a module being any one of a networking, computing, and/or storage device, or other device of the like.

Figure 1:
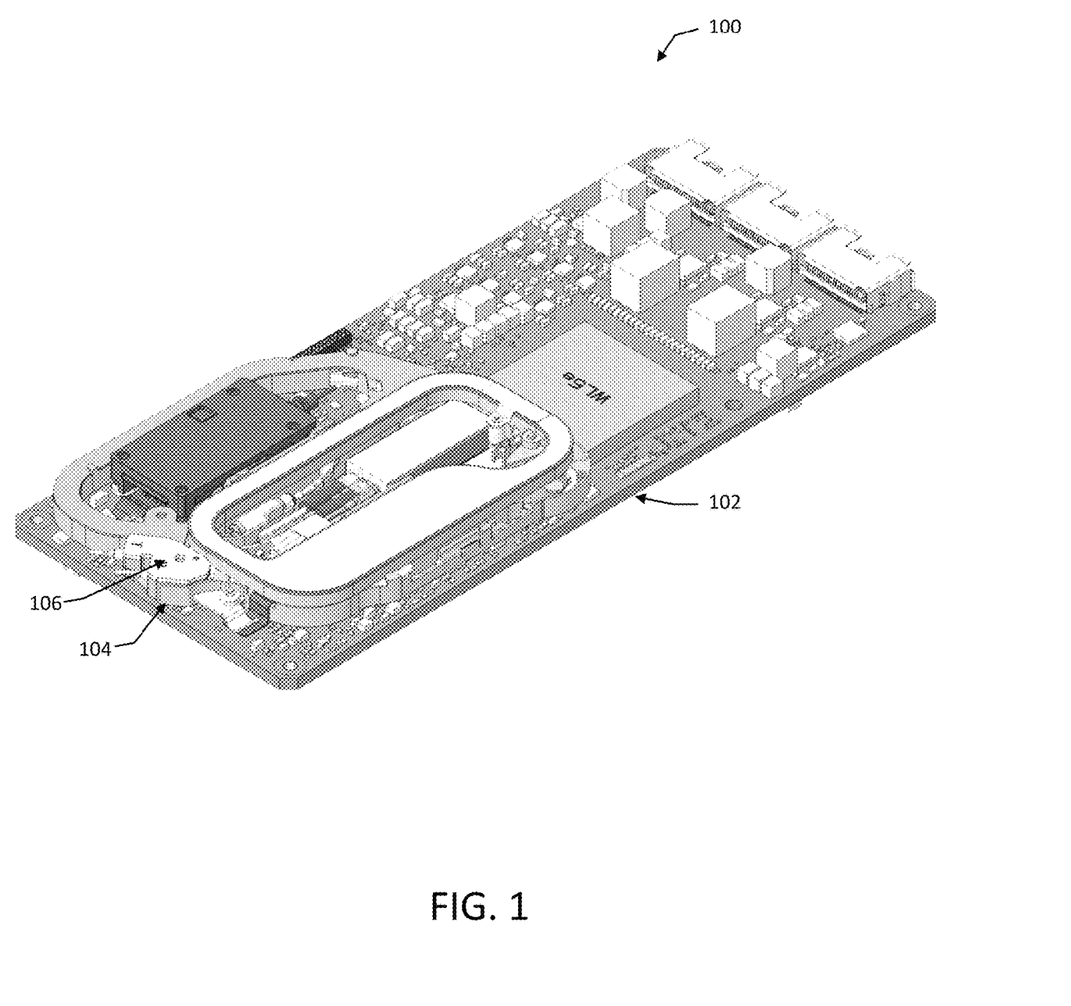
FIG. 1 is a diagram of an optical assembly including the integrated connector holder of the present disclosure.

FIG. 1 is a diagram of an optical assembly 100 including the integrated connector holder of the present disclosure. The optical assembly 100 can be any system which uses optical fibers for data transfer, for example a modem or other network components of the like. The optical assembly 100 of the present disclosure includes a PCB 102 whereon a plurality of components are coupled. A fiber tray 104 is coupled to the PCB 102 and houses a plurality of optical to digital components. The integrated connector holder 106 of the present disclosure is coupled to the fiber tray 104, thus securing the integrated connector holder 106 to the PCB 102.

Figure 2:
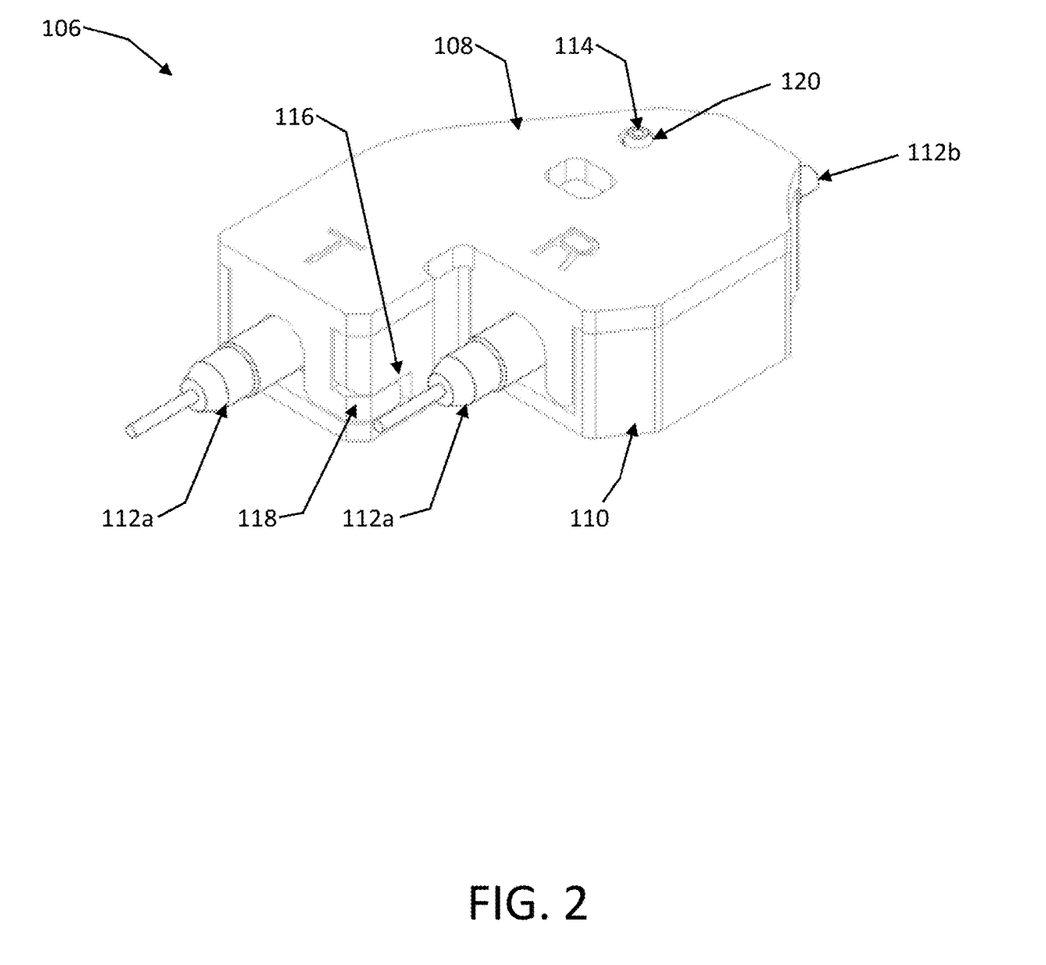
FIG. 2 is a diagram of the integrated connector holder of the present disclosure.

The integrated connector holder 106 includes a plurality of fiber connectors (FIG. 2). These fiber connectors being adapted to couple fiber optic cables to the optical assembly 100. The integrated connector holder 106 of the present disclosure includes fiber connectors for transmitting and receiving functions of the optical assembly. The fiber connectors are made up of the connector plug and connector receptacle (described further in FIG. 5). The integrated connector holder 106 secures and aligns the components of the connectors, allowing the fiber optic cables to transmit and receive data to and from the optical assembly 100 while also allowing the connectors to be disassembled with ease.

FIG. 2 is a diagram of the integrated connector holder 106 of the present disclosure. The integrated connector holder 106 includes a holder lid 108, a holder base 110 a plurality of fiber connectors 112, and a spring-pin mechanism 114. The holder lid 108 and holder base 110 are adapted to be coupled together via a plurality of grooves 116 and tabs 118, the flanges 118 being adapted to slide into the grooves 116 and be secured in place. The holder lid 108 and holder base 110 are secured together via the spring-pin mechanism 114. The holder lid 108 further includes a hole 120 disposed through the holder lid 108, adapted to receive a pin 114a of the spring-pin mechanism 114. The pin 114a secures the holder lid 108 to the holder base 110 by inserting into the hole 116 as the holder lid 108 is slid into place via the grooves 116 and tabs 118.

Figure 3:
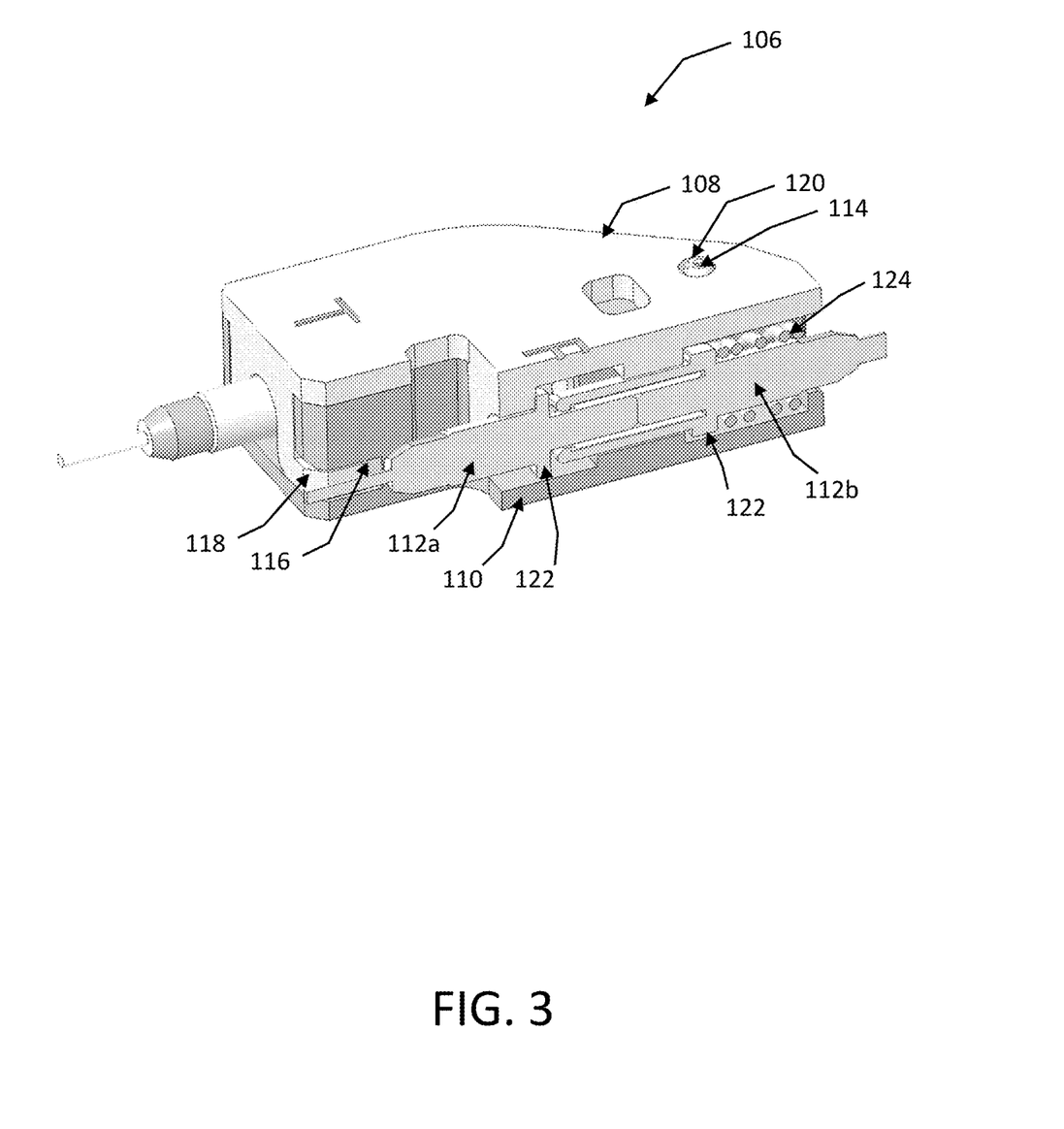
FIG. 3 is a section view diagram of the integrated connector holder of the present disclosure.

The connector plugs 112a protrude through the holder lid 108 and are secured in place via flanges (described further in FIG. 3). The coupling of the holder lid 108 and the holder base 110 causes the components of the connectors 112 to be coupled, thus making the optic connection. The components of the connectors 112 include the connector plugs 112a and the connector receptacles 112b, the connector plugs 112a fitting into the connector receptacles 112b as the integrated connector holder 106 is assembled.

FIG. 3 is a section view diagram of the integrated connector holder 106 of the present disclosure. Again, the integrated connector holder 106 includes a holder lid 108, a holder base 110 a plurality of fiber connectors 112, and a spring-pin mechanism 114. The holder lid 108 and holder base 110 are adapted to be coupled together via a plurality of grooves 116 and tabs 118, the tabs 118 being adapted to slide into the grooves 116 and be secured in place. The holder lid 108 and holder base 110 are secured together via the spring-pin mechanism 114.

The fiber connectors 112 can be seen in more detail and further include the connector plugs 112a and connector receptacles 112b. The connector plugs 112a further include a flange 122 circumferentially extending from the surface of the connector plug 112a. This flange 122 is retained by the structure of the holder lid 108, forcing the connector plug 112a into position as the holder lid 108 is slid into place on the holder base 110. The connector plug 112a of the present embodiment is one of a male plug connector, in other embodiments, the connector plug 112a may include a different connection mechanism of the like.

The connector receptacle 112b of the present embodiment is one of a female plug connector, adapted to receive the connector plug 112a. In other embodiments, the connector receptacle 112b may include a different connection mechanism of the like. The connector receptacle 112b further includes a flange 122 and a connector spring 124. The flange 122 of the connector receptacle 112b circumferentially extends from the surface of the connector receptacle 112b, and is adapted to be a bearing surface for the connector spring 124. The connector spring 124 is disposed around the surface of the connector receptacle 112b, and when assembled, the connector spring 124 provides a force on the flange 122 of the connector receptacle 112b, causing the connector receptacle 112b to be forced into position to accept the end of the connector plug 112a.

The spring-pin mechanism 114 can be seen protruding into the hole 120 of the holder lid 108. The pin 114a, when extended into the hole 120, secures the holder lid 108 and holder base 110 in place. When the holder lid 108 is slid into place, guided by the plurality of tabs 118 and grooves 116, the connector plugs 112a and connector receptacles 112b are also coupled. The connector 112 is fully mated when the holder lid 108 is locked into place by the spring-pin mechanism 114, engaging the connector spring 124.

Figure 4:
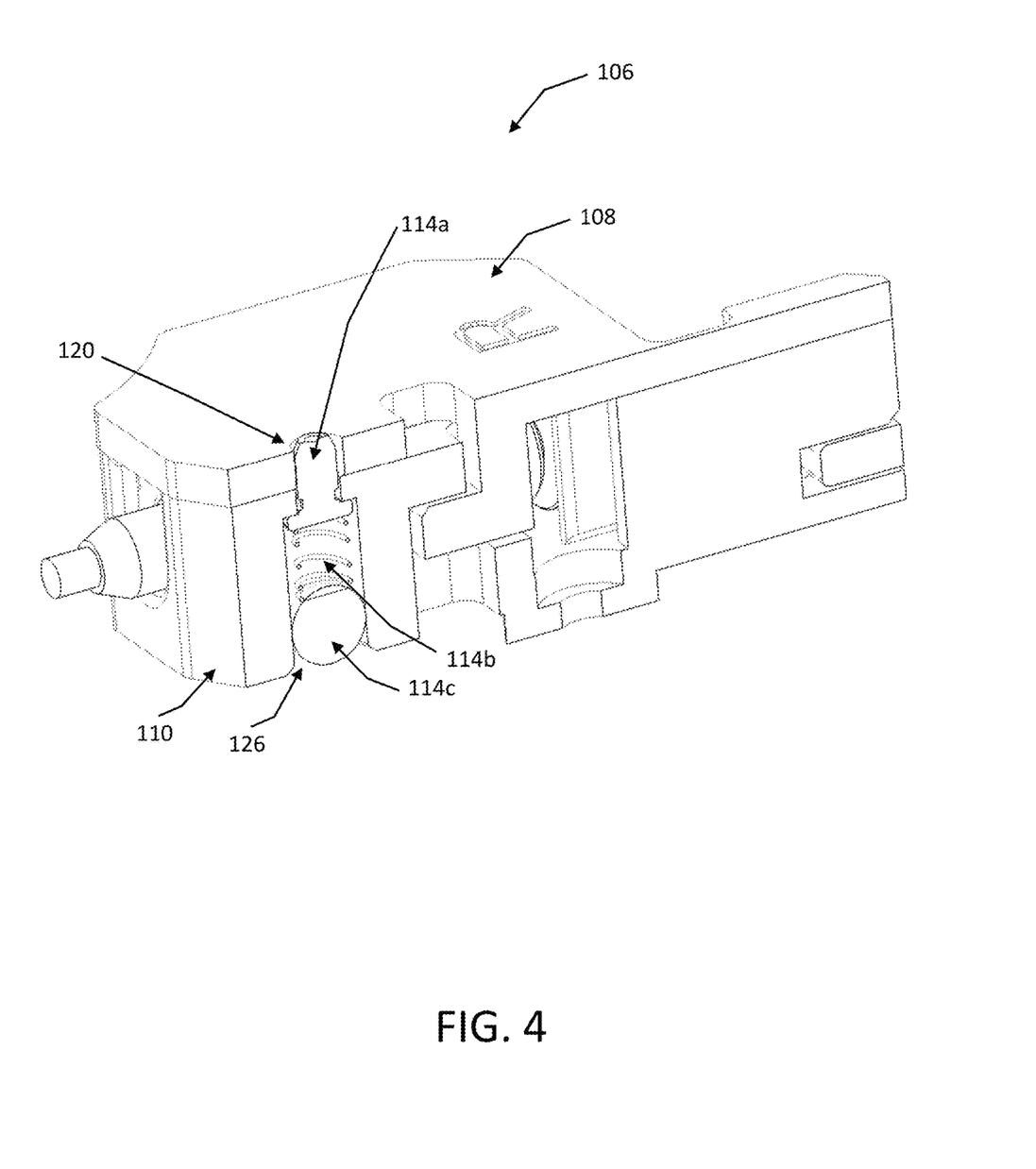
FIG. 4 is a section view diagram of the integrated connector holder of the present disclosure.

FIG. 4 is a section view diagram of the integrated connector holder 106 of the present disclosure. Again, the integrated connector holder 106 of the present embodiment includes a holder lid 108, a holder base 110 a plurality of fiber connectors 112, and a spring-pin mechanism 114. The spring-pin mechanism 114 further includes a pin 114a, a spring 114b, and an insert 114c. The spring-pin mechanism 114 is adapted to be disposed inside of a cavity 126 in the holder base 110.

The pin 114a is forced upward by the spring 114b and is constrained by the structure of the holder base 110 and cavity 126. The pin 114a protrudes from the surface of the holder base 110 in order to insert into the hole 120 of the holder lid 108. The tabs 118 and grooves 116 constrain the holder lid 108 onto the holder base 110, only allowing the holder lid 108 to slide in one axis. When the pin 114a inserts into the hole 120, the holder lid is constrained in all axes to the holder base 110. It will be appreciated that the integrated connector holder 106 of the present disclosure may include a different locking mechanism to the spring-pin mechanism 114, such as screws, clips, adhesive, and others of the like.

Figure 5:
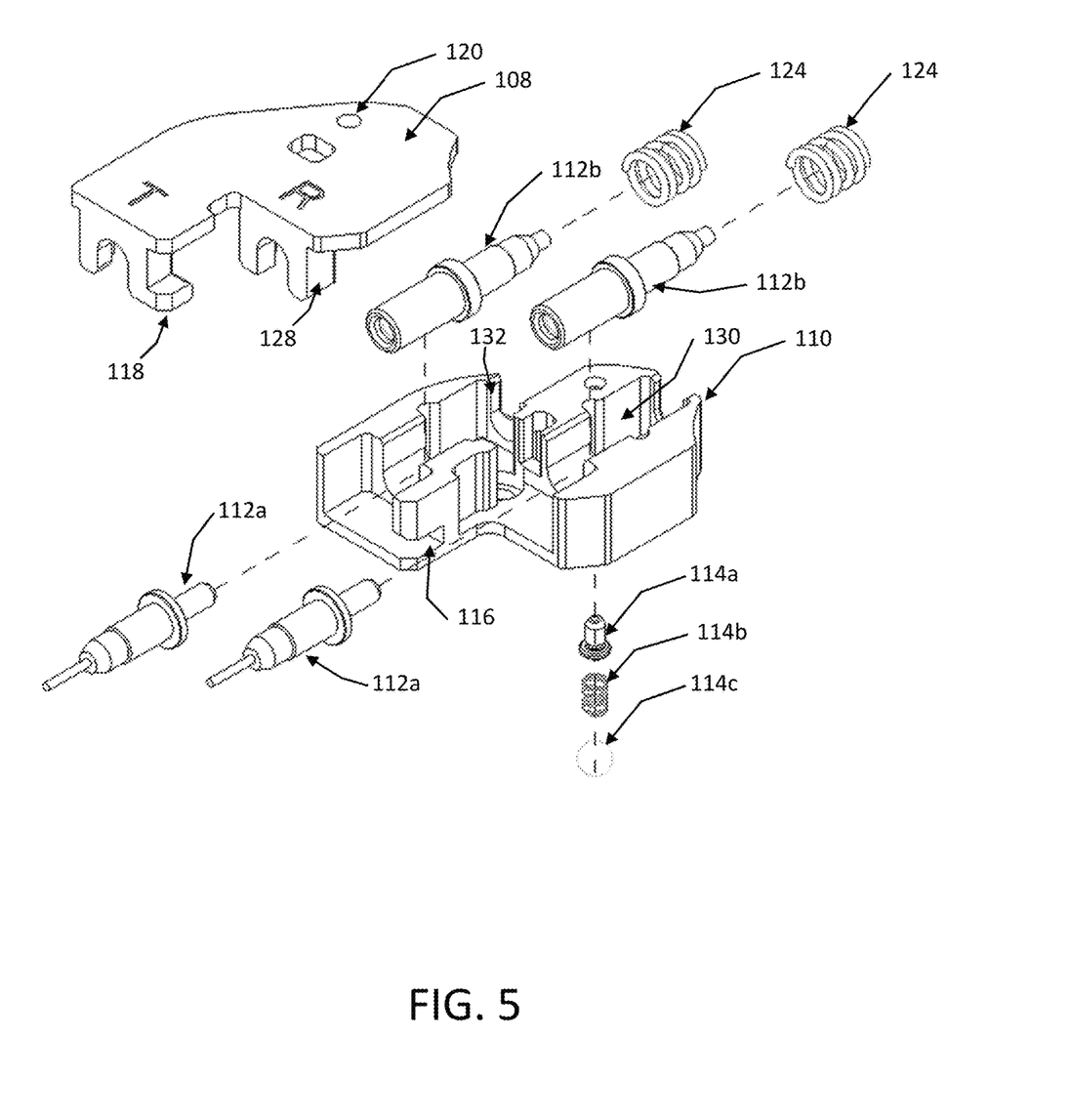
FIG. 5 is an exploded view diagram of the integrated connector holder of the present disclosure.

FIG. 5 is an exploded view diagram of the integrated connector holder 106 of the present disclosure. Each component of the integrated connector holder 106 can be seen in detail. The integrated connector holder of the present disclosure again includes the holder lid 108, the holder base 110, plurality of fiber connectors 112, and spring-pin mechanism 114. The fiber connectors 112 further include connector plugs 112a, connector receptacles 112b, and connector springs 124. The spring-pin mechanism 114 further includes a pin 114a, a spring 114b, and an insert 114c.

The integrated connector holder 106 works by adding the connector spring 124 just large enough to fit around the connector receptacle 112b body prior to splicing. The connector receptacle 112b and connector spring 124 are then inserted into the holder base 110 by compressing the connector spring 124 and pressing down. The pressure of the connector spring 124 will hold the connector receptacle 112b in place temporally once inserted into place, allowing a plurality of additional connector receptacles 112b to be installed. Next, the corresponding Tx and Rx connector plugs 112a are gently inserted into the respective connector receptacles 112b. The holder lid 108 is then installed using a downwards motion, cradling the connector plugs 112a, and sliding into place pushing the connector plugs 112a and connector receptacles 112b together. The present embodiment uses a spring-pin mechanism 114 again including of a pin 114a, spring 114b, and insert 114c with locking tabs 118 to secure the holder lid 108 in place when fully mated to facilitate assembly.

To remove the fiber connectors 112 for service or testing, the spring-pin mechanism 114 is pushed down through the hole 120, and the holder lid 108 is slid off the assembly. The connector plugs 112a can then be disconnected from the connector receptacles 112b. To remove the connector receptacles 112b from the holder base 110, the connector receptacles 112b can be lifted up, compressing the connector spring 124 gently until the connector receptacle 112b is free. This process only requires a common tweezer-like tool to push down the spring-pin mechanism 114.

Figure 6:
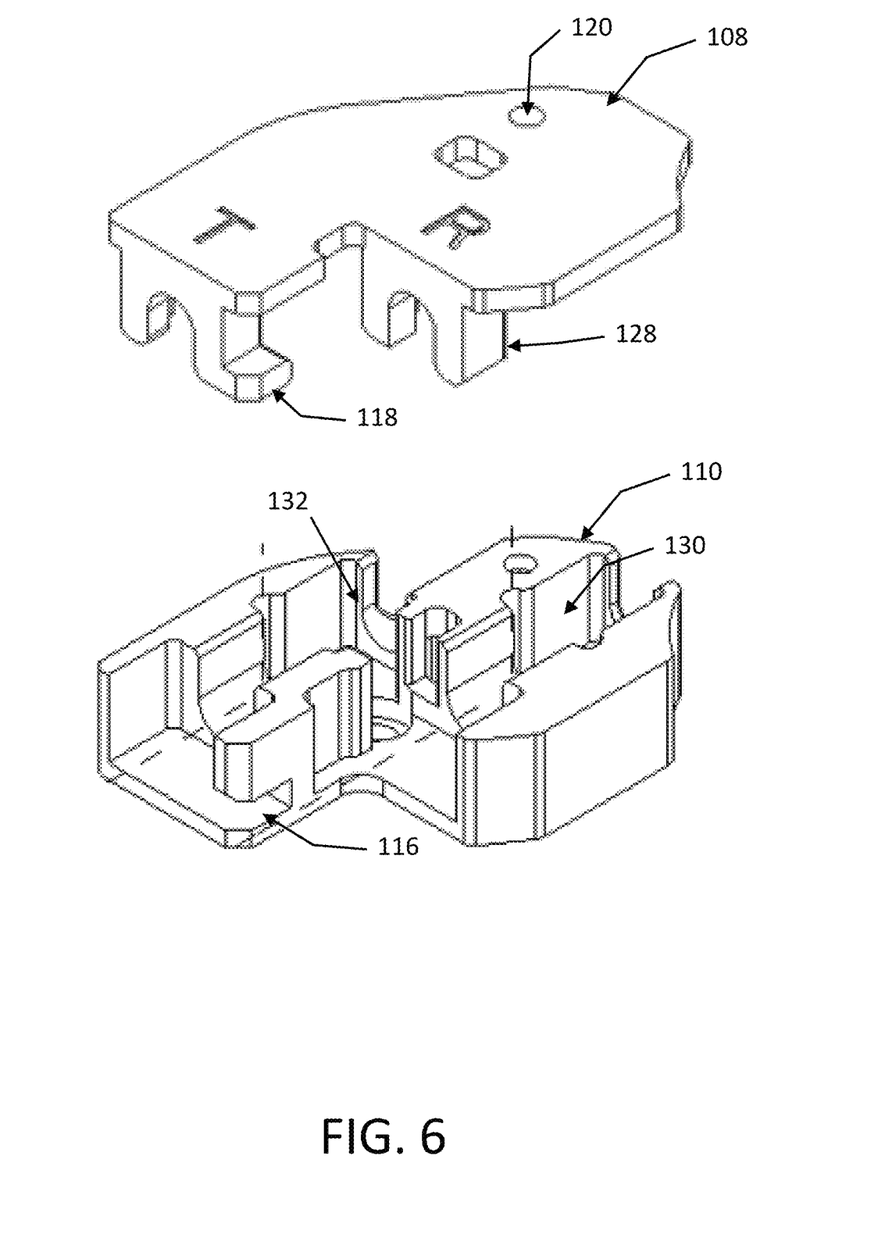
FIG. 6 is a diagram of the holder lid and holder base of the integrated connector holder of the present disclosure.

FIG. 6 is a diagram of the holder lid 108 and holder base 110 of the integrated connector holder 106 of the present disclosure. The holder lid 108 includes a plurality of tabs 118 for securing the holder lid 108. The plurality of tabs 118 are adapted to be inserted into the plurality of grooves 116 disposed on the holder base 110. These tabs 118 and grooves 116 are adapted to constrain the holder lid 108 onto the holder base 110 by only allowing the holder lid 108 to slide into position with respect to the holder base 110.

The holder lid 108 further includes a plurality of bearing surfaces 128, adapted to compress the flange 122 of the connector plug 112a into position. The bearing surfaces 128 allow a portion of the connector plug 112a to pass through, only retaining the flange 122, thus securing the connector plug 112a while allowing the fiber cable or other cable of the like to pass through. Again, the holder lid 108 includes a hole 120 for the pin 114a to insert into. This secures the holder lid 108 onto the holder base 110, thus securing the connectors 112 together.

The holder base 110 includes a plurality of grooves 116 which are adapted to accept the tabs 118 of the holder lid 108. The grooves 116 both align and secure the holder lid 108 onto the holder base 110. The holder base further includes voids 130 for the connectors 112 to be disposed inside of. These voids 130 are sized as to contain the connectors securely, allowing for a precise and assured connection. The holder base further includes spring bearing surfaces 132, adapted to compress the connector spring 124 onto the flange 122 of the connector receptacle 112b. The holder base 110 allows the connector receptacle 112b to pass through, only retaining the flange 122 of the connector receptacle 112b via the connector spring 124, thus securing the connector receptacle 112b while allowing the fiber cable or other cable of the like to pass through to the optical assembly 100.

Figure 7:
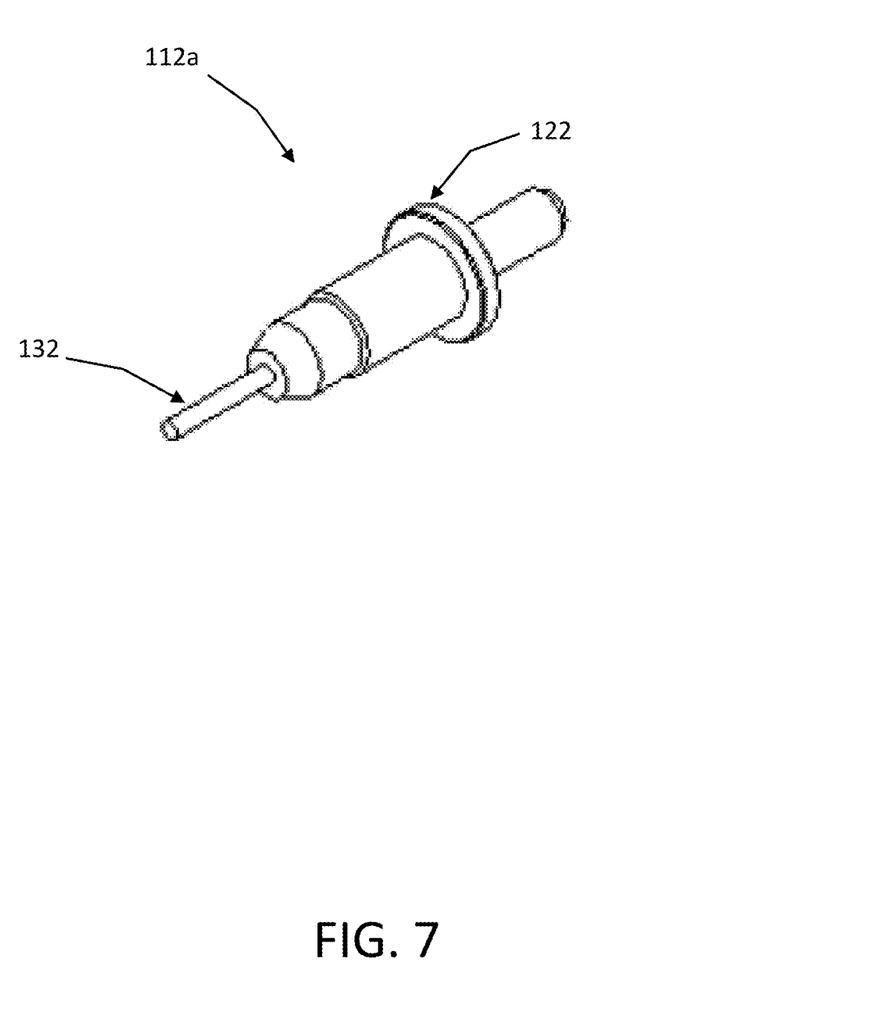
FIG. 7 is a diagram of the connector plug of the integrated connector holder of the present disclosure.

FIG. 7 is a diagram of the connector plug 112a of the integrated connector holder 106 of the present disclosure. The connector plug 112a makes up the portion of the fiber connector 112 that is coupled to the fiber cables 132 or other cables of the like which extend from the optical assembly 100 of the present disclosure. The connector plug 112a of the present embodiment is one of a male plug connector, in other embodiments, the connector plug 112a may include a different connection mechanism of the like. This connector plug 112a is adapted to be inserted into a receiving end of the connector receptacle 112b within the integrated connector holder 106.

The connector plug 112a includes a flange 122 circumferentially extending from the surface of the connector plug 112a. This flange 122 is retained by the structure of the holder lid 108, forcing the connector plug 112a into position as the holder lid 108 is slid into place on the holder base 110. The bearing surfaces 128 of the holder lid 108 both secure and push the connector plug 112a into place as well as hold the connector plug 112a in a secure way as to assure the connection will not be compromised if the optical assembly 100 is moved. It will be appreciated that the integrated connector holder 106 of the present disclosure can be adapted to accommodate any number of fiber connectors 112 or any other connector of the like.

Figure 8:
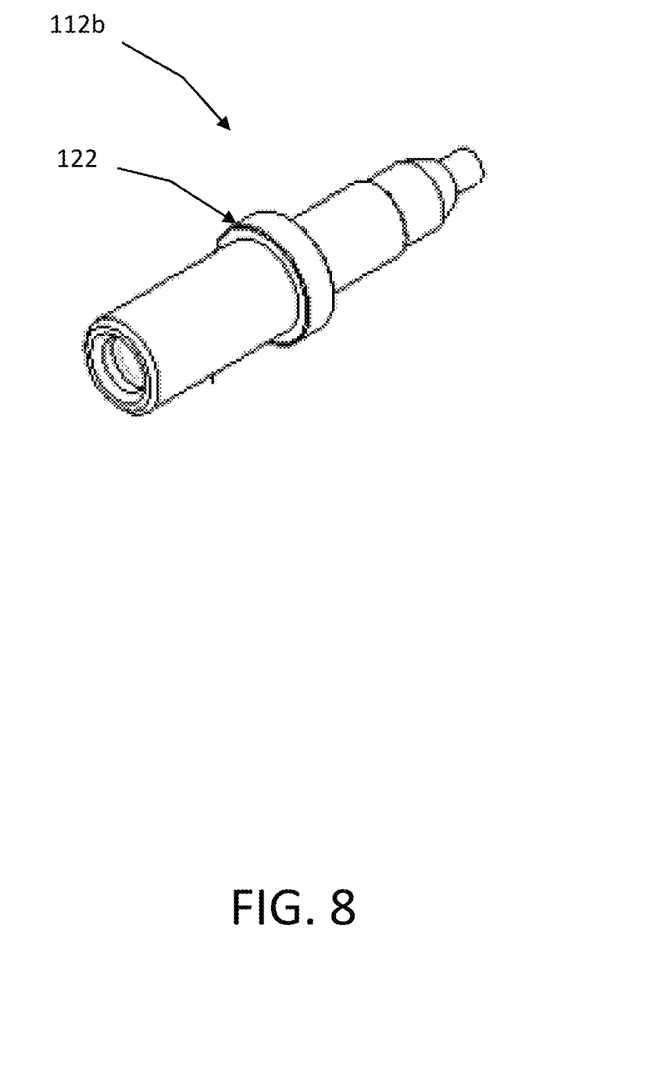
FIG. 8 is a diagram of the connector receptacle of the integrated connector holder of the present disclosure.

FIG. 8 is a diagram of the connector receptacle 112b of the integrated connector holder 106 of the present disclosure. The connector receptacle 112b makes up the portion of the fiber connector 112 that is coupled to the optical assembly 100 or other assembly of the like which requires connections such as the fiber optic connections of the present disclosure. The connector receptacle 112b of the present embodiment is one of a female receptacle connector, in other embodiments, the connector receptacle 112b may include a different connection mechanism of the like. This connector receptacle 112b is adapted to receive a mating end of the connector plug 112a within the integrated connector holder 106.

The connector receptacle 112b includes a flange 122 circumferentially extending from the surface of the connector receptacle 112b. This flange 122 is compressed by the connector spring 124, forcing the connector receptacle 112b into position as the connector receptacle 112b is placed in the holder base 110. The bearing surfaces 128 and voids 130 of the holder base 110 both secure and push the connector receptacle 112b into place via the connector spring 124 as well as hold the connector receptacle 112b in a secure way as to assure the connection will not be compromised if the optical assembly 100 is moved. It will be appreciated that the integrated connector holder 106 of the present disclosure can be adapted to accommodate any number of fiber connectors 112 or any other connector of the like.

Figure 9:
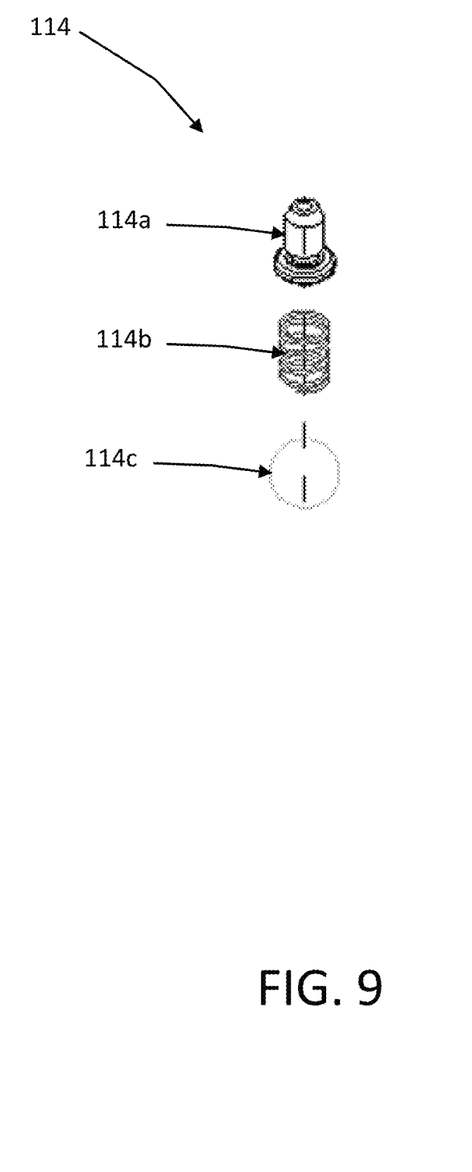
FIG. 9 is a diagram of the spring-pin mechanism of the integrated connector holder of the present disclosure.

FIG. 9 is a diagram of the spring-pin mechanism 114 of the integrated connector holder 106 of the present disclosure. The spring-pin mechanism 114 of the present embodiment includes a pin 114a, a spring 114b, and an insert 114c. all of which are disposed within the cavity 126 of the holder base 110. The insert 114c is positioned at the bottom of the cavity 126 and supported by the underlying PCB 102 or fiber tray 104. The spring 114b is positioned between the insert 114c and the pin 114a, thus forcing the pin 114a upward. The pin 114a is constrained from being pushed completely out of the cavity 126 by the flange 122 circumferentially extending from the surface of the surface of the pin 114a. The pin 114a protrudes from the cavity 126 as to secure the holder lid 108. To attach or remove the holder lid 108 from the holder base 110 for service or testing, the spring-pin mechanism is pushed down and the holder lid 108 is slid on or off the holder base 110.

Figure 10:
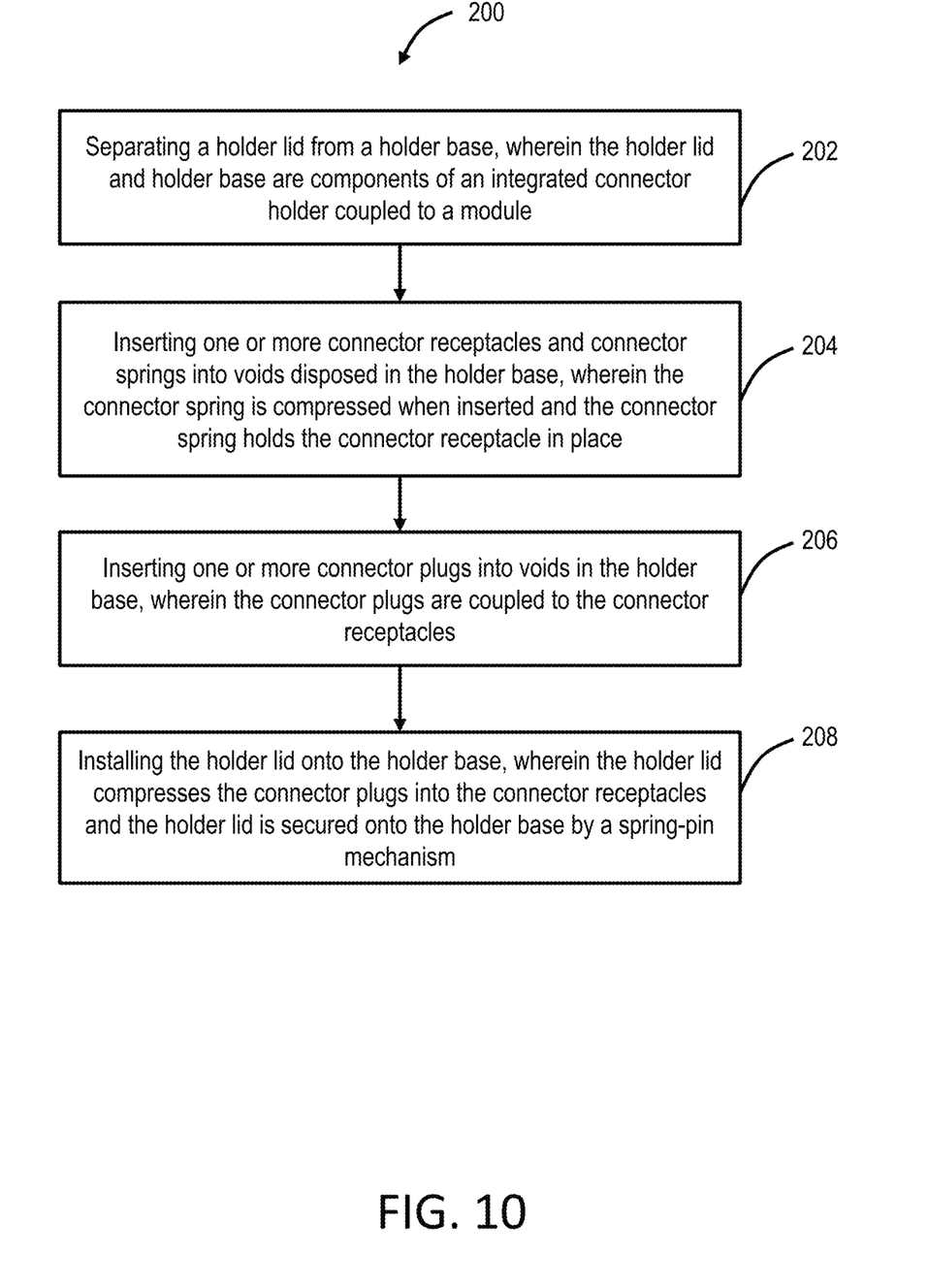
FIG. 10 is a flow diagram of a method of installing fiber optic cables to the integrated connector holder of the present disclosure.

FIG. 10 is a flow diagram of a method of installing fiber optic cables to the integrated connector holder 106 of the present disclosure. The fiber optic cables are coupled to a plurality of connector plugs 112a and connector receptacles 112b. The holder lid 108 is separated from the holder base 110. One or more connector receptacles 112b are inserted into the voids 130 in the holder base 110 by compressing the connector springs 124, thus causing the connector springs 124 to hold the connector receptacle 112b in place. The connector plugs 112a are then inserted into the voids 130 in the holder base 110 and coupled to the connector receptacles 112b. The holder lid 108 is then installed onto the holder base 110 by aligning the tabs 118 with the grooves 116 and sliding the holder lid 108 into place. The holder lid 108 secures the connector plugs 112a to the connector receptacles 112b and the holder lid 108 is secured to the holder base 110 by the spring-pin mechanism 114.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. An integrated connector holder adapted for use in an optical assembly, the integrated connector holder comprising:
   a holder lid;
   a holder base; and a plurality of connectors adapted to be positioned and secured by the holder lid and holder base, wherein the plurality of connectors each comprise a connector plug and a connector receptacle adapted to be disposed and secured within the holder lid and the holder base;

wherein the holder lid comprises bearing surfaces to secure the connector plugs in the integrated connector holder and compress flanges of the connector plugs towards the connector receptacles.

2. The integrated connector holder of claim 1, wherein the connectors are adapted to couple fiber optic cables to one another.

3. The integrated connector holder of claim 1, further comprising a spring-pin mechanism to secure the holder lid onto the holder base.

4. The integrated connector holder of claim 3, wherein the holder lid comprises a hole to accept a pin of the spring-pin mechanism to secure the holder lid.

5. The integrated connector holder of claim 1, wherein the holder lid is removable from the holder base.

6. The integrated connector holder of claim 1, wherein the holder lid comprises a tab and the holder base comprises a groove, wherein the tab is adapted to be inserted into the groove to secure and retain the holder lid onto the holder base.

7. The integrated connector holder of claim 1, wherein the holder base comprises bearing surfaces to compress a plurality of connector springs onto a flange of the plurality of connector receptacles to facilitate a secure connection of the connector plugs and connector receptacles.

8. The integrated connector holder of claim 1, wherein the connector plugs are those of male connectors and the connector receptacles are those of female connectors, and wherein the connector plugs are adapted to be inserted into the connector receptacles.

9. A module for use in a hardware platform for networking, computing, and/or storage, the module comprising:
    a Printed Circuit Board (PCB);
    a plurality of components electrically mounted to the PCB;
    an integrated connector holder comprising
        a holder lid,
        a holder base, and
        a plurality of connectors adapted to be positioned and secured by the holder lid and holder base, wherein the plurality of connectors each comprise a connector plug and a connector receptacle adapted to be disposed and secured within the holder lid and the holder base,
        wherein the holder lid comprises bearing surfaces to secure the connector plugs in the integrated connector holder and compress flanges of the connector plugs towards the connector receptacles.

10. The module of claim 9, wherein the connectors are adapted to couple fiber optic cables to one another.

11. The module of claim 9, wherein the holder lid is removable from the holder base.

12. The module of claim 9, further comprising a spring-pin mechanism to secure the holder lid onto the holder base.

13. The module of claim 12, wherein the holder lid comprises a hole to accept a pin of the spring-pin mechanism to secure the holder lid.

14. The module of claim 9, wherein the holder lid comprises a tab and the holder base comprises a groove, wherein the tab is adapted to be inserted into the groove to secure and retain the holder lid onto the holder base.

15. The module of claim 9, wherein the holder base comprises bearing surfaces to compress a plurality of connector springs onto a flange of the plurality of connector receptacles to facilitate a secure connection of the connector plugs and connector receptacles.

16. A method of installing fiber optic cables to a module, the method comprising the steps of:
    separating a holder lid from a holder base, wherein the holder lid and holder base are components of an integrated connector holder coupled to a module;
    inserting one or more connector receptacles and connector springs into voids disposed in the holder base, wherein the connector spring is compressed when inserted and the connector spring holds the connector receptacle in place;
    inserting one or more connector plugs into voids in the holder base, wherein the connector plugs are coupled to the connector receptacles; and
    installing the holder lid onto the holder base, wherein bearing surfaces of the holder lid compress the connector plugs into the connector receptacles.

17. The integrated connector holder of claim 6, wherein the tab is adapted to be inserted into the groove as the bearing surfaces of the holder lid compress flanges of the connector plugs towards the connector receptacles.

18. The module of claim 14, wherein the tab is adapted to be inserted into the groove as the bearing surfaces of the holder lid compress flanges of the connector plugs towards the connector receptacles.

19. The method of claim 16, wherein a tab of the holder lid is inserted into a groove of the holder base as the bearing surfaces of the holder lid compress the connector plugs into the connector receptacles.

* * * * *